US007385191B1

(12) United States Patent
McMurtry et al.

(10) Patent No.: US 7,385,191 B1
(45) Date of Patent: Jun. 10, 2008

(54) HIGH PRESSURE MEMBRANE INTRODUCTION FOR A MASS SPECTROMETER

(75) Inventors: Gary McMurtry, Honolulu, HI (US); David Copson, Honolulu, HI (US)

(73) Assignee: Pacific Environmental Technologies, LLC, Honolulu, HI (US)

( * ) Notice: Subject to any disclaimer, the term of this patent is extended or adjusted under 35 U.S.C. 154(b) by 222 days.

(21) Appl. No.: 11/292,875

(22) Filed: Dec. 1, 2005

Related U.S. Application Data

(60) Provisional application No. 60/632,457, filed on Dec. 1, 2004.

(51) Int. Cl.
*B01D 59/44* (2006.01)
*H01J 49/00* (2006.01)

(52) U.S. Cl. ...................... 250/288; 250/281; 250/292; 73/863.23; 73/864.73

(58) Field of Classification Search ................ 250/281, 250/288, 292; 73/863.23, 864.73
See application file for complete search history.

(56) References Cited

U.S. PATENT DOCUMENTS

| | | | | |
|---|---|---|---|---|
| 6,727,498 | B2 * | 4/2004 | Fries et al. | 250/288 |
| 2004/0089079 | A1 * | 5/2004 | Engebretson | 73/863.23 |

* cited by examiner

*Primary Examiner*—Jack I. Berman
*Assistant Examiner*—Meenakshi S Sahu
(74) *Attorney, Agent, or Firm*—Leighton K. Chong

(57) ABSTRACT

A membrane-introduction mass spectrometer (MIMS) device has a sample inlet assembly provided with a membrane held by an outer retaining ring across the entrance of a central passage, a porous metal frit backing the membrane, and a cylindrical support piece supporting the frit. In a preferred embodiment, the membrane is a 10-micron thickness layer of silicone evenly coated upon an inert polymer backing material. The porous frit is a titanium or steel sponge metal. The cylindrical support piece is made of titanium with small, drilled thru-holes to allow passage of gases and volatile organics into the mass spectrometer. The sample inlet assembly includes a high-pressure temperature probe for sensing fluid temperature to correct for temperature variations in membrane diffusion rates. The sample inlet assembly is provided as a front end to an underwater sampling probe.

14 Claims, 4 Drawing Sheets

HIGH PRESSURE MEMBRANE INTRODUCTION FOR A MASS SPECTROMETER

This U.S. patent application claims the benefit of the priority filing date of U.S. Provisional Application No. 60/632,457, filed on Dec. 1, 2004.

TECHNICAL FIELD

This invention relates to the implementation of a membrane introduction-based mass spectrometer system. In order to achieve scientific, governmental and commercial success, the pressure tolerance and depth range of such a device must be improved. Most importantly it is intended to reliably measure dissolved gases and volatile organics in a variety of natural and man-made solutions and environments.

BACKGROUND OF INVENTION

Membrane-introduction mass spectrometry (MIMS) devices have been used to measure dissolved elements in natural and manmade fluid environments. The MIMS approach was first described by Hoch, G. and Kok B, “A mass spectrometric inlet system for sampling gases dissolved in liquid phase”, 1963, Archives of Biochemistry and Biophysics, 101:160, and numerous improvements to the method have since been described and published. A recent variation on the MIMS device is described, for example, in U.S. Pat. No. 6,727,498 to Fries et al., showing a portable mass spectrometer for underwater use that includes a watertight case having an inlet and means for transforming an analyte gas molecule from a solution phase into a gas phase positioned within the case. To date, however, no MIMS device has been described that can successfully operate to high pressures (>400 bars) and great water depths (>4,000 m).

SUMMARY OF INVENTION

It is therefore a principal purpose of this invention is to create a MIMS device and method that can successfully and reliably sample diverse solutions and environments that range from 1 bar (atmosphere) to >400 bars pressure. It is also desired to provide for recording of temperature effects upon the membrane diffusion rate at these various pressures, and to stop any leakage past the membrane into the instrument pressure housing.

In accordance with the present invention, a membrane-introduction mass spectrometer (MIMS) device comprises: a sample inlet assembly for introduction of a sample from an external fluid environment into an inner housing of the MIMS device containing a mass spectrometer instrument, wherein said sample inlet assembly includes a membrane held across the entrance of a central passage for allowing a sample of the fluid to permeate therethrough, a porous metal frit backing the membrane, and a cylindrical support piece supporting the frit, said assembly being configured to allow passage of gases and volatile organics into the mass spectrometer instrument while having sufficient strength and surface flatness to keep the membrane from deforming or tearing.

In a preferred embodiment, the membrane is coated with a hydrophobic material. For example, the membrane is a 10-micron thickness layer of silicone evenly coated upon an inert polymer backing material. The membrane is sealed against a high-pressure fluid environment with front and back radial o-rings. The porous frit consists of titanium or steel sponge metal that is permeable to gas flow. The cylindrical support piece is made of titanium with small, drilled thru-holes to allow passage of gases and volatile organics into the mass spectrometer.

The sample inlet assembly includes a sample inlet port, an aperture for a high-pressure temperature probe, and a gas purge port for the instrument pressure housing. The sample inlet port and high-pressure temperature probe are aligned on a diametral axis of the assembly. It is covered by a high-pressure end cap that contains a plenum for allowing fluid from the surrounding fluid environment to flow in contact with the sample inlet into the MIMS device. The fluid temperature is sensed by the temperature probe inside the plenum, and its signals are used to correct for temperature variations in membrane diffusion rates. The assembly is provided as a front end to an underwater sampling probe.

Other objects, features, and advantages of the present invention will be explained in the following detailed description of the invention having reference to the appended drawings.

DETAILED DESCRIPTION OF INVENTION

In the following detailed description, certain preferred embodiments are described with specific details set forth in order to provide a thorough understanding of the present invention. However, it will be recognized by one skilled in the art that the present invention may be practiced without these specific details or with equivalents thereof. In other instances, well known methods, procedures, components, functions have not been described in detail as not to unnecessarily obscure aspects of the present invention.

Figure 1D:
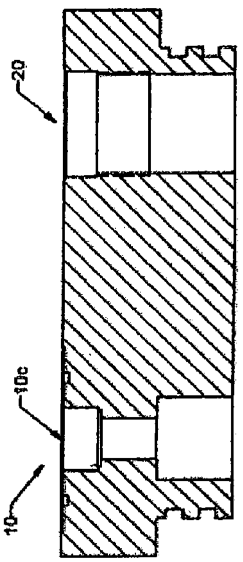
FIG. 1D shows an elevation view taken in section through viewlines D-D in FIG. 1B.
Figure 1C:
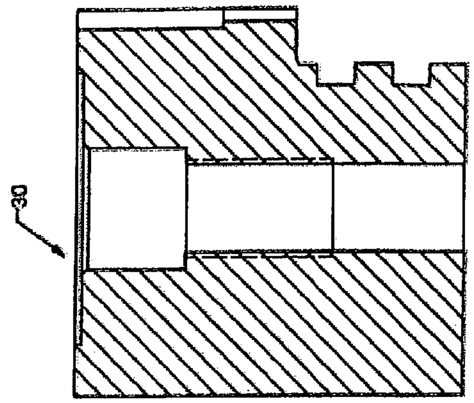
FIG. 1C shows an elevation view taken in section through viewlines C-C in FIG. 1B.
Figure 1A:
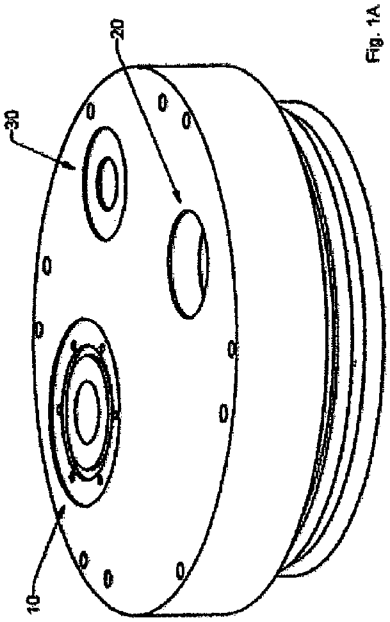
FIG. 1A shows a perspective view of a preferred embodiment of a sample inlet assembly for a membrane-introduction mass spectrometer (MIMS) device in accordance with the present invention.

Referring to FIG. 1A, shows a perspective view of a preferred embodiment of a sample inlet assembly for a membrane-introduction mass spectrometer (MIMS) device in accordance with the present invention. The MIMS inlet assembly has three thru-holes including a sample inlet 10, aperture for a high-pressure temperature probe 20, and a threaded gas purge port 30 and opening 30*a* (plug not shown) for the instrument pressure housing. The sample inlet 10 includes an outer retaining ring 10*a* held by fasteners 10*b* to secure a membrane 10*c* across the entrance of a central passage into an inner housing of the MIMS device.

Figure 1B:
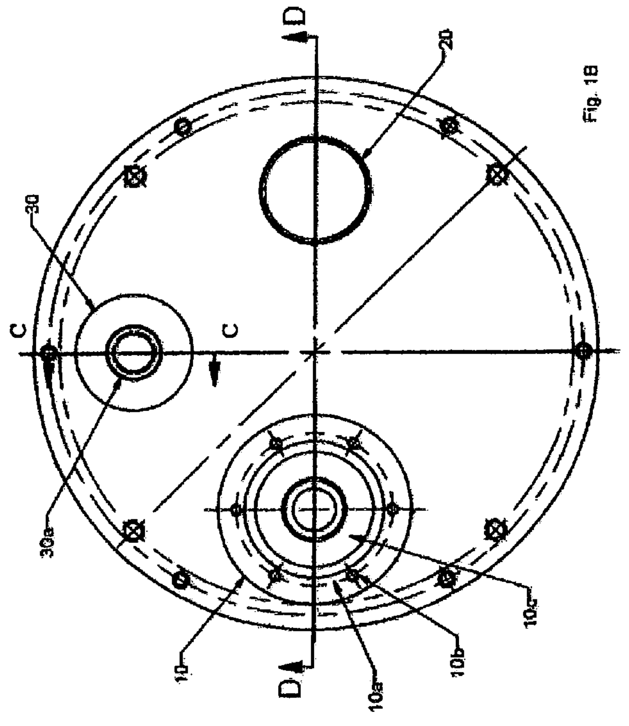
FIG. 1B shows a plan view thereof.

In FIG. 1B, the preferred MIMS configuration has the sample inlet 10 and high-pressure temperature probe 20 aligned on a diametral axis coincident with the viewlines D-D, and the threaded gas purge port 30 aligned with a transverse axis coincident with viewlines C-C. FIG. 1C shows an elevation view of the threaded gas purge plug 30 taken in section through viewlines C-C in FIG. 1B. FIG. 1D shows an elevation view of the sample inlet 10 and high-pressure temperature probe 20 taken in section through viewlines D-D.

Figure 2:
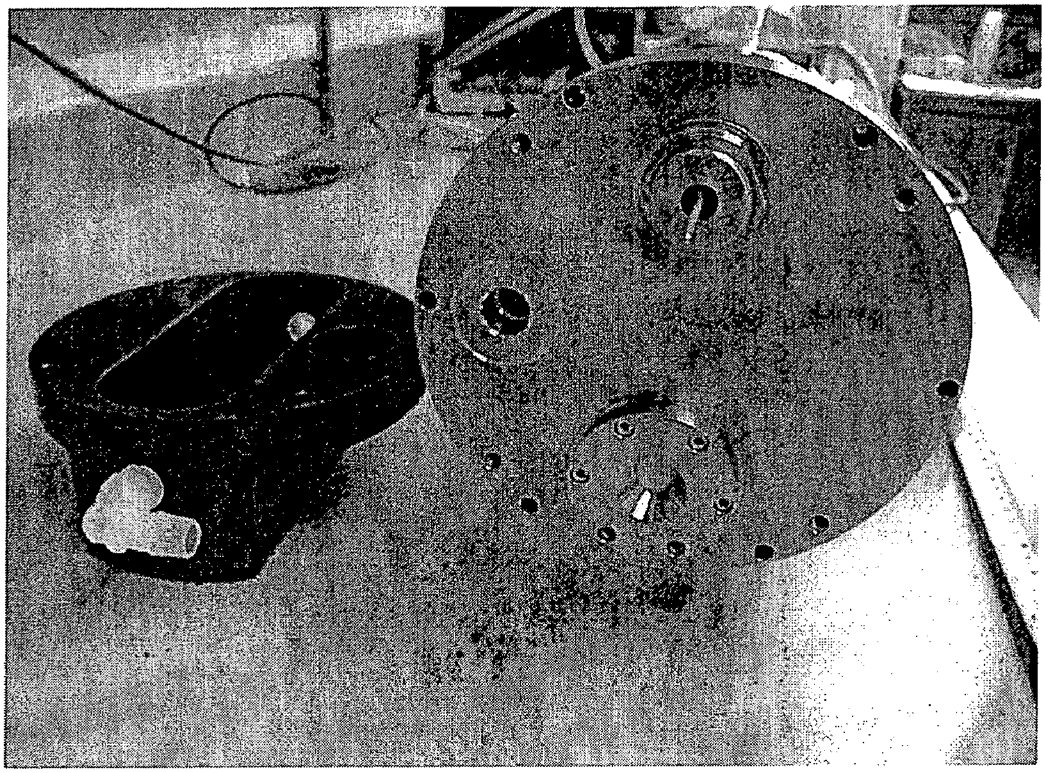
FIG. 2 shows a prototype model of the MIMS sample inlet assembly with a high-pressure end cap in disassembled view.

FIG. 2 shows a prototype model of the MIMS sample inlet assembly that is covered with a high-pressure end cap (disassembled view). The end cap contains a plenum for allowing fluid from the surrounding fluid sampling environment to flow in contact with the sample inlet into the MIMS device.

Figure 3:
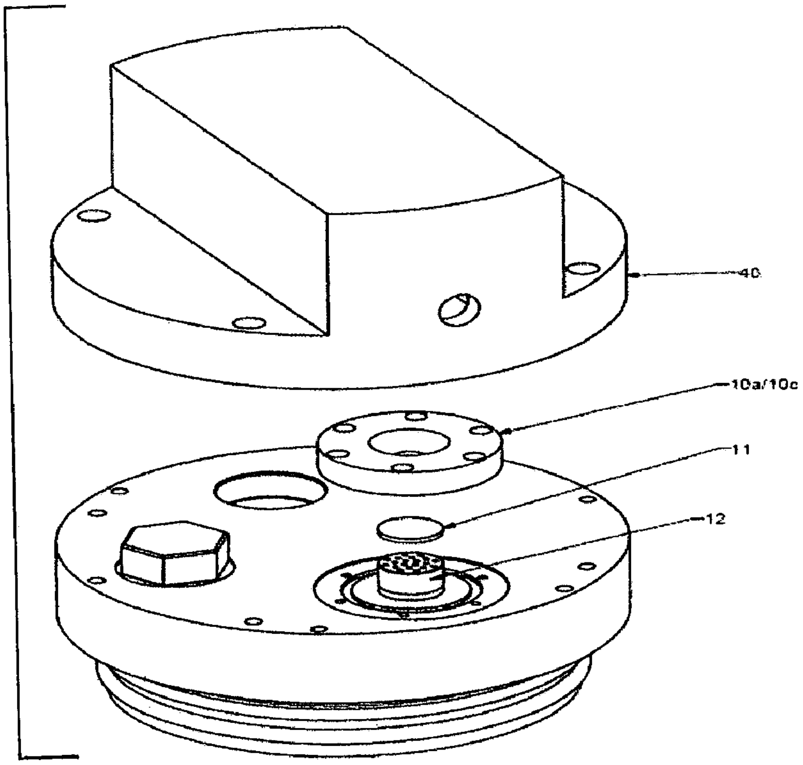
FIG. 3 shows the prototype model of the MIMS sample inlet assembly with the high-pressure end cap in assembly view.

FIG. 3 shows the prototype model of the MIMS sample inlet assembly with the high-pressure end cap 40 in assembly view. It shows in further detail the outer retaining ring 10*a* holding the membrane 10*c* that is immediately backed by a titanium or stainless steel porous frit 11. The porous frit 11 consists of sponge metal of about 10 micron pore size that is permeable to gas flow but with sufficient internal strength and surface flatness to keep the membrane and its surface coating from deforming or tearing. The frit is in turn supported by a cylindrical piece 12 of titanium with several small, drilled thru-holes to allow passage of gases and volatile organics into the mass spectrometer vacuum system.

The membrane 10*c* is coated with a hydrophobic material such as silicone supplied to us by Capsum GMB (Germany). For example, it may consist of a 10-micron thickness layer of silicone evenly coated upon an inert polymer backing material. Other polymers (e.g., Teflon) and silicone thicknesses can be used, but greater polymer thicknesses will slow the transfer rate of dissolved gases and volatile organic compounds across the membrane. These can, however, be used to adjust the sample loading rates into the mass spectrometer. The external high-pressure, liquid water is sealed off with two (front and back) radial o-rings, one in the inner face that surrounds the membrane and another in the outer retaining ring 10*a* that presses upon the membrane's outer, coated surface.

Figure 4:
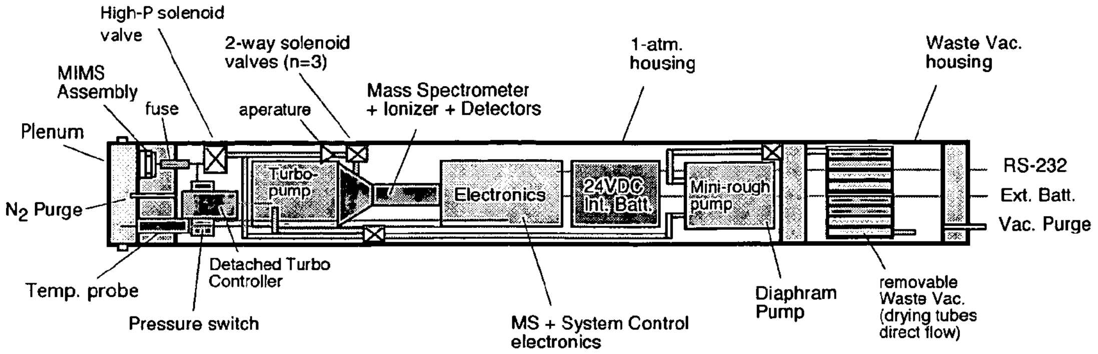
FIG. 4 is a schematic diagram showing the MIMS sample inlet assembly and pressure housing end-cap assembled in an underwater sampling probe.

FIG. 4 shows the MIMS inlet assembly assembled in an underwater sampling probe. The overall probe instrument consists, from left-to-right, of: (a) the sample fluid plenum; (b) the MIMS inlet assembly; (c) the main, pressurized instrument housing (either at 1-atmosphere or a low-vacuum environment) containing a high-pressure fuse, a pressure switch, a high-pressure solenoid valve, a turbo-molecular pump and controller, a mass spectrometer (MS) and system control electronics, internal batteries, and a mini-roughing pump (diaphragm pump); and (d) a waste vacuum housing containing removable and rechargeable getters. The pressure housing also has a bulkhead between the main and waste vacuum housings, a rear end cap, and high-strength metal tubing connected with sealing double radial o-rings at each join. Various solenoid vacuum valves direct the sample flow, with both gas and electrical penetrators within the bulkhead and rear end cap, the latter for connection to remote I/O via RS-232 link and external power via battery or cable. Custom software and the embedded computer and associated system control electronics direct the sampling sequence and record the sample temperature, date/time and MS spectral data.

The sampling sequence begins with fluid flow directed by the plenum past the inlet assembly and sample introduction taken through the membrane. Fluid temperature is sensed with the thermocouple probe inside the plenum, with its signals recorded by the computer. Next, dissolved gases and volatile organics are allowed past the fuse and high-pressure solenoid valve into the vacuum system of the instrument, provided: (1) no rapid pressure drop has been sensed by the fuse, which triggers above a certain set threshold; and (2) no slow leakage has been sensed by the pressure switch, which will close a circuit and not allow the high-pressure solenoid valve to open. Next, if pressures remain low, a "by-pass" vacuum solenoid valve past capillary tubing immediately behind the high-pressure solenoid valve and another solenoid valve at the waste vacuum entrance are opened, and the rough pump pulls sample through the system to achieve a vacuum pressure level within the range of the turbo-molecular pump. Excess sample pressure is pushed into the waste vacuum. The turbo-molecular pump pulls the vacuum within the "high vacuum" region of the MS to within its operational range, and sample is then directed through an aperture and the sample vacuum solenoid valve into the MS. After sample characterization, the MS is turned off and the pumps are allowed to continue running for a set time to clear the vacuum. Then the valves are closed and pumping is stopped. The entire sampling sequence is repeatable and user programmable via the embedded computer system and custom software.

Figure 5:
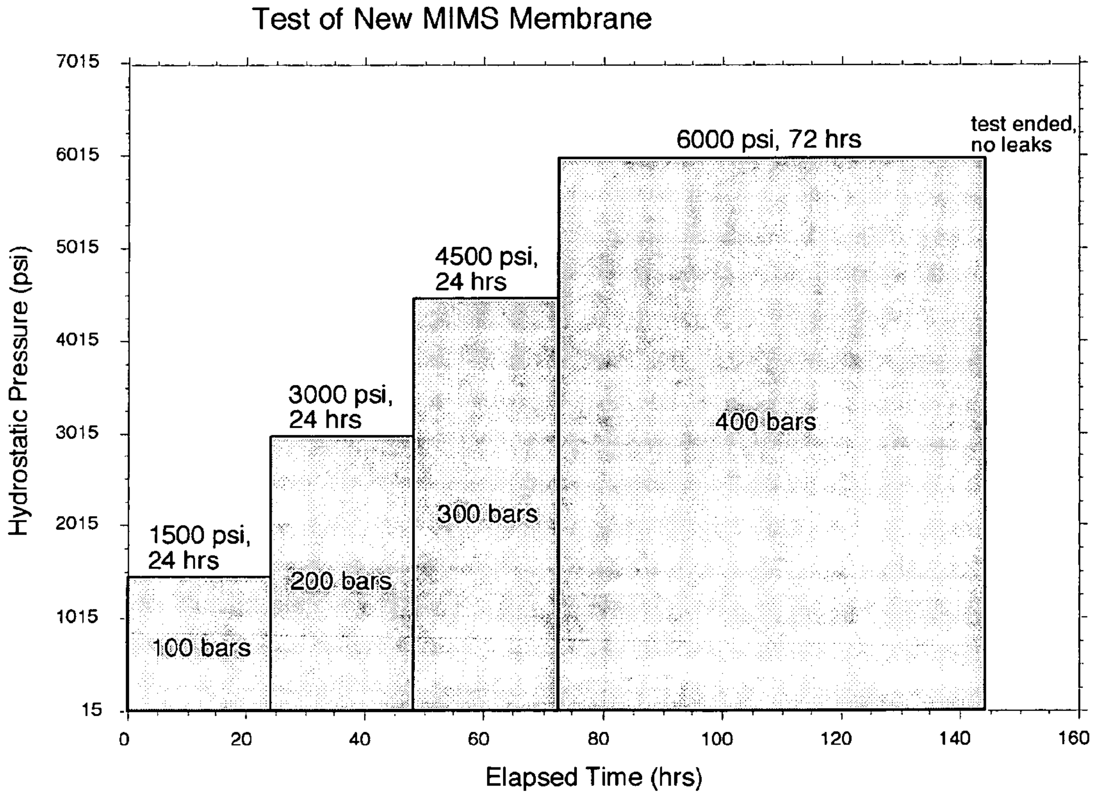
FIG. 5 is a graph showing performance tests for leaks conducted of the MIMS assembly comparing hydrostatic pressure over elapsed time.

FIG. 5 shows the results of performance tests for leaks conducted of the MIMS assembly comparing hydrostatic pressure over elapsed time. The test used a 10-micron silicon-coated membrane. The membrane passed a 6000 psia (400 bar) ramped pressure test that lasted for 144 hours.

Figure 6C:
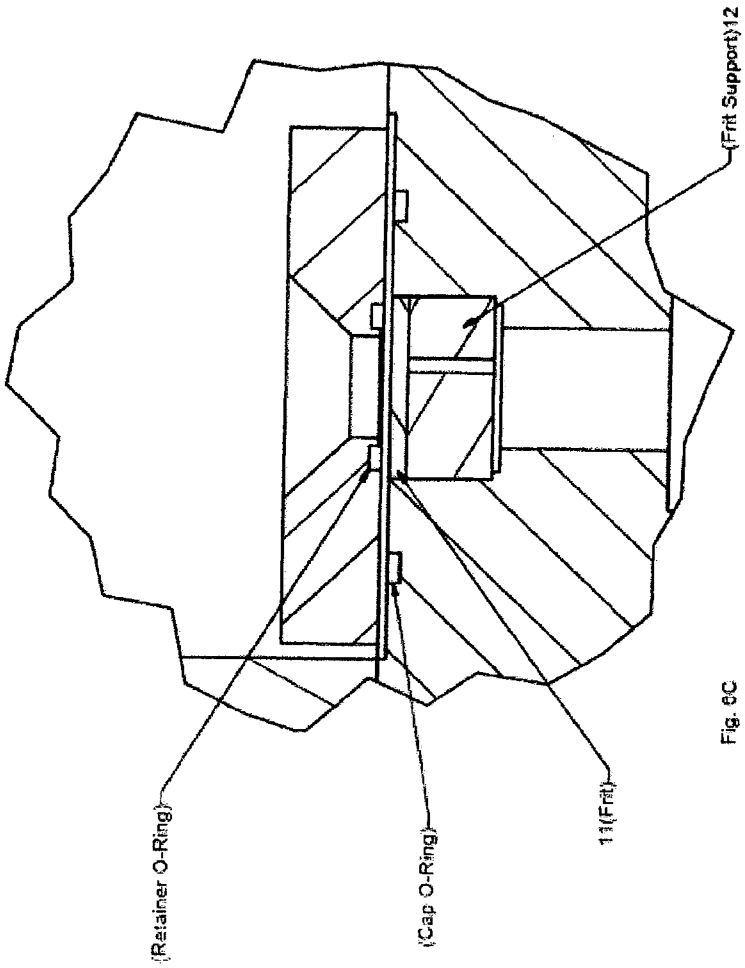
FIGS. 6A, 6B, and 6C show plan, elevation, and detailed inset views, respectively, of the pressure housing end-cap used with the MIMS sample inlet assembly in FIGS. 1-3 above.
Figure 6A:
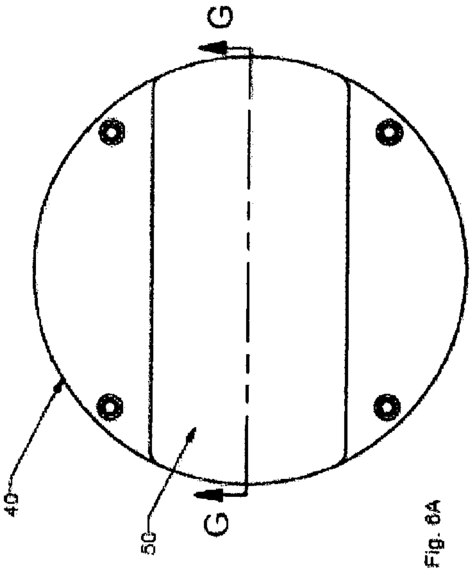
Figure 6B:
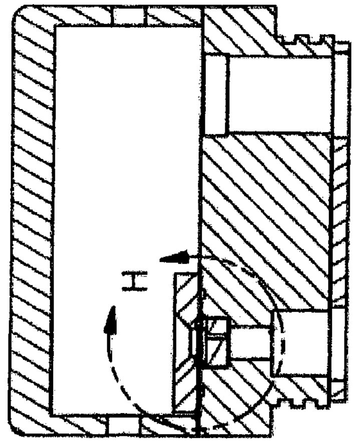

FIGS. 6A, 6B, and 6C show plan, elevation, and detailed inset views, respectively, of the pressure housing end-cap used with the MIMS sample inlet assembly in FIGS. 1-3 above. The cylindrical end cap 40 has a raised rectangular-shaped plenum 50, shown in FIG. 6B taken along view lines G-G, with openings on opposite ends to allow external fluid flow into the plenum. The plenum chamber allows fluid to flow over the sample inlet 10. The sample inlet, area "H" shown in inset detail in FIG. 6C, includes the membrane 10*c* held by the outer retaining ring 10*a* and sealed by inner and outer O-rings, the backing frit 1, and the cylindrical frit support 12.

In summary, the invention provides a sample inlet structure for safe and reliable sampling of a fluid environment for a mass spectrometer. It is particularly suitable for remote, deep water bodies and in deep wells. It can correct for temperature variations in membrane diffusion rates by making simultaneous temperature measurements in situ at the various ambient fluid pressures. It also provides a method and means for prevention of both rapid and slow leakage of high-pressure solutions into the pressure housing of the instrument. The main advantages of this invention are the ability to safely and reliably perform MIMS at high pressures and great water depths, such as in deep lakes, wells, waterways and the open ocean.

It is understood that many modifications and variations may be devised given the above-described principles of the invention. It is intended that all such modifications and variations be considered as within the spirit and scope of this invention, as defined in the following claims.

The invention claimed is:

1. A membrane-introduction mass spectrometer (MIMS) device comprising:

a sample inlet assembly for introduction of a sample from an external fluid environment into an inner housing of the MIMS device containing a mass spectrometer instrument;

wherein said sample inlet assembly includes a membrane held across the entrance of a central passage for allowing a sample of the fluid to permeate therethrough, a porous metal frit having a flat surface arranged as a backing for the membrane, and a cylindrical support piece supporting the frit and having holes therethrough to allow passage of gases and volatile organics into the mass spectrometer instrument, said porous metal frit supported by said cylindrical support piece having sufficient strength and surface flatness to keep the membrane from deforming or tearing.

2. A MIMS device according to claim 1, wherein the membrane is coated with a hydrophobic material.

3. A MIMS device according to claim 1, wherein the membrane is a 10-micron thickness layer of silicone evenly coated upon an inert polymer backing material.

4. A MIMS device according to claim 1, wherein the membrane is sealed with front and back radial o-rings.

5. A MIMS device according to claim 1, wherein the porous frit consists of sponge metal that is permeable to gas flow but with sufficient internal strength and surface flatness to keep the membrane from deforming or tearing.

6. A MIMS device according to claim 5, wherein the porous frit is a titanium or steel metal of about 10 micron pore size.

7. A MIMS device according to claim 1, wherein the cylindrical support piece is made of titanium with small, drilled thru-holes to allow passage of gases and volatile organics into the mass spectrometer.

8. A MIMS device according to claim 1, wherein the sample inlet assembly has a sample inlet port, an aperture for a high-pressure temperature probe, and a gas purge port for the instrument pressure housing.

9. A MIMS device according to claim 8, wherein the sample inlet port and high-pressure temperature probe are aligned on a diametral axis of the assembly.

10. A MIMS device according to claim 8, wherein the sample inlet assembly is covered by a high-pressure end cap that contains a plenum for allowing fluid from the surrounding fluid environment to flow in contact with the sample inlet into the MIMS device.

11. A MIMS device according to claim 10, wherein fluid temperature is sensed by the temperature probe inside the plenum, and its signals are used to correct for temperature variations in membrane diffusion rates.

12. A MIMS device according to claim 1, wherein the sample inlet assembly is assembled as a front end to an underwater sampling probe.

13. A MIMS device according to claim 1, including a rapid-pressure-drop fuse for shutting off the sample inlet assembly upon detecting a pressure drop above a given threshold.

14. A MIMS device according to claim 1, including a pressure switch and solenoid valve to shut off the sample inlet assembly upon detection of a slow leak.

* * * * *